United States Patent [19]
Schrepfer

[11] Patent Number: 6,152,409
[45] Date of Patent: Nov. 28, 2000

[54] DEVICE FOR INCREASING THE HEIGHT ADJUSTMENT RANGE WITH A LEVELLING SHOE PROVIDED THEREWITH

[75] Inventor: Rudolf Schrepfer, Küsnacht, Switzerland

[73] Assignee: Air Loc Schrepfer AG, Switzerland

[21] Appl. No.: 09/130,829

[22] Filed: Aug. 7, 1998

[30] Foreign Application Priority Data

Sep. 18, 1997 [DE] Germany ............... 297 16 792 U

[51] Int. Cl.$^7$ ............................................. F16M 11/24
[52] U.S. Cl. ........................... 248/188.2; 248/146.11; 248/178.1; 248/649; 248/677
[58] Field of Search ..................... 248/146.11, 178.1, 248/188.2, 188.3, 649, 677, 678; 411/539, 540, 541, 535, 551; 404/26

[56] References Cited

U.S. PATENT DOCUMENTS

| | | | |
|---|---|---|---|
| 470,072 | 3/1892 | Ormsby | 411/539 |
| 760,914 | 5/1904 | Newberry | 411/539 |
| 3,263,727 | 8/1966 | Herpolsheimer | 411/149 |
| 4,187,647 | 2/1980 | Hall | 42/20 |
| 4,408,930 | 10/1983 | Nimet et al. | 405/209 |
| 4,809,421 | 3/1989 | Justice | 29/525.1 |
| 4,846,435 | 7/1989 | Cohen | 248/346 |
| 5,035,395 | 7/1991 | Settlemier et al. | 248/634 |
| 5,110,082 | 5/1992 | Rowan, Jr. | |
| 5,316,061 | 5/1994 | Lee | 144/218 |
| 5,584,464 | 12/1996 | Whittaker | 248/678 |
| 5,704,582 | 1/1998 | Golembiewski et al. | 248/500 |
| 5,797,228 | 8/1998 | Kemeny | 52/167.7 |
| 5,985,025 | 4/1999 | Alesi et al. | 248/678 |

FOREIGN PATENT DOCUMENTS

| | | |
|---|---|---|
| 0037473 | 10/1981 | European Pat. Off. . |
| 4212412 | 10/1993 | Germany . |
| 4227924 | 2/1994 | Germany . |
| 4400164 | 7/1995 | Germany . |
| 0767417 | 9/1980 | U.S.S.R. ................ 411/539 |
| 9601978 | 1/1996 | WIPO . |

*Primary Examiner*—Ramon O. Ramirez
*Assistant Examiner*—Walter Landry
*Attorney, Agent, or Firm*—Gallagher & Lathrop; David N. Lathrop

[57] ABSTRACT

The height adjustment range of a levelling shoe with an annular support surface is increased by a device that includes a spacer ring having a first face and a second face. The first face has, at a radially inward location, an axially protruding annular projection. The second face has, at a radially inward location, a recess that is substantially complementary to the annular projection. There is also provided a slot that extends over the entire axial length of the spacer ring and projection and extends from an outside peripheral surface of the spacer ring to an inside peripheral surface of the projection. A levelling shoe includes a support ring, a levelling bolt and a spacer ring as described, where the outside diameter of the annular projection is smaller than the inside diameter of the support ring so that the projection engages the support ring to form a connection that is positively locking in the plane of the contacting surfaces and where the slot has a width that is greater than the diameter of the anchor bolt.

12 Claims, 1 Drawing Sheet

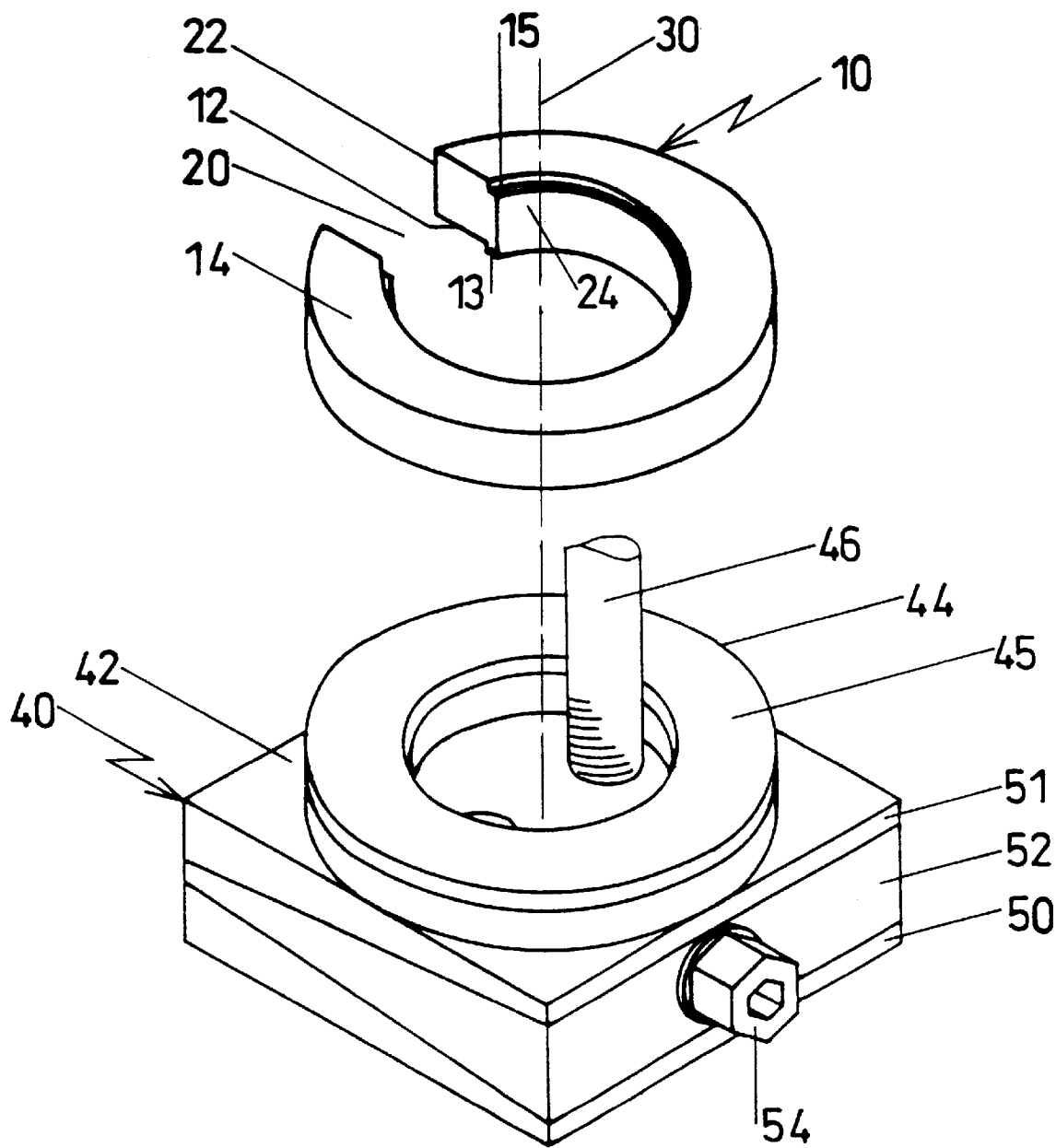

DEVICE FOR INCREASING THE HEIGHT ADJUSTMENT RANGE WITH A LEVELLING SHOE PROVIDED THEREWITH

TECHNICAL FIELD

The present invention concerns a device for increasing the height adjustment range of a levelling shoe having an annular support surface, and a levelling shoe provided with such a device.

BACKGROUND ART

In general machines are adjusted into a horizontal position which is required or desirable for trouble-free operation thereof, by means of a plurality of levelling shoes and anchor bolts which are respectively associated therewith. As however the weight distribution of machines of that kind is frequently not uniform but sometimes varies widely, massive, large and thus expensive levelling shoes need to be used only at heavily loaded locations, while smaller and thus less expensive levelling shoes can be employed at less heavily loaded locations. The use of different levelling shoes however frequently gives rise to the problem that the height adjustment range available in the case of smaller levelling shoes may not sufficient.

When using conventional levelling shoes with a relatively large flat support surface which is for example square or rectangular, height compensating plates can be inserted in order to increase the height adjustment range. The insertion of height compensating plates of that kind with one or more through bores for the anchor bolt or bolts, however, requires dismantling the levelling shoe or removing the levelling shoe from the supported machine, which is time-consuming and consequently disadvantageous. If slotted intermediate sheet metal shim or spacer members are used instead of the height compensating plates which have through holes, precise levelling is not guaranteed because for example the protruding edge flange configurations which are produced upon stamping of such members mean that flat surface contact thereof is not guaranteed. In addition it is possible for intermediate sheet metal shim or spacer members of that kind to slip out during operation, which increases the susceptibility to trouble and has an adverse effect on operational safety. The described height compensating plates with through holes or the slotted spacer members can also be used with levelling shoes with a support ring arranged on the top side thereof, but they suffer from the same disadvantages in principle as in the case of levelling shoes with a large-area support surface. Levelling shoes of that kind with a support ring are however advantageous in particular if on its underside the support ring is in the form of a portion of a sphere and the corresponding contact surface of the levelling shoe is of a complementary configuration thereto in order to permit inclined adjustment of the supported machine or precise horizontal orientation thereof when the floor is inclined, as is indispensable for stress-free precision levelling.

DISCLOSURE OF INVENTION

The object of the present invention is to provide a device with which the height adjustment range of a levelling shoe having an annular support surface can be increased in a simple manner without disassembly of the levelling shoe or removal of the anchor bolt from the supported machine.

Another object of the present invention is to provide a levelling shoe having a support ring arranged on its top side, whose height adjustment range can be increased without removal of its anchor bolt from the supported machine. According to the teachings of one aspect of the present invention, a device for increasing the height adjustment range of a levelling shoe having an annular support surface, includes: a spacer ring having a first face which has at a radially inward location an axially protruding annular projection and having a second face which has at a radially inward location a recess which is substantially complementary to the annular projection, wherein there is provided a slot that extends over the entire axial length of the spacer ring and the projection and extends from an outside peripheral surface of the spacer ring to an inside peripheral surface of the projection. According to the teachings of another aspect of the present invention, a levelling shoe including a support ring and a levelling bolt, wherein the support ring is arranged on a top side of the levelling shoe and has an inside diameter, wherein a spacer ring rests on the support ring and has a lower face with an axially protruding annular projection at a radially inward location, has an upper face with a recess that is substantially complementary to the annular projection at the radially inward location, and has a slot that extends over an entire axial length of the spacer ring and the projection and extends from an outside peripheral surface of the spacer ring to an inside peripheral surface of the projection, and wherein an outside diameter of the projection is smaller than an inside diameter of the support ring so that the projection engages the support ring to form a connection that is positively locking in a plane of contact surfaces and wherein the slot has a width that is greater than a diameter of the anchor bolt.

The slot in the precision spacer ring, which is referred to hereinafter for the sake of brevity as just the spacer ring, makes it possible to fit the spacer ring onto the support ring even if the anchor bolt is already screwed into the levelling shoe and the machine to be supported is lifted off the support ring. The annular projection, which protrudes axially on the underside of the spacer ring at a radially inward location, engages into the support ring in the position of being fitted onto the levelling shoe and thus forms a connection with the support ring, which constitutes a positively locking engagement in the plane of the contact surfaces. That arrangement prevents the spacer ring from unintentionally sliding or being pushed away from the support ring. The recess, which is provided on the top side of the spacer ring at a radially inward location and which is substantially complementary to the annular projection, makes it possible to fit onto a fitted spacer ring further spacer rings which are also prevented from slipping or sliding away by virtue of the engagement of the projection into the recess in the subjacent spacer ring. Stacking a plurality of spacer rings in mutually superposed relationship, which is possible by virtue of that design configuration, affords the great advantage that the height adjustment range can be very flexibly increased to a considerable extent without requiring spacer rings of different sizes or different heights. It is therefore sufficient to produce a single structural form of a spacer ring of a given height, and that results in advantageous production costs by virtue of the higher unit numbers which can be achieved thereby.

If the anchor bolt is arranged centrally relative to the levelling shoe, the operation of pushing the spacer ring onto the support ring is easily accomplished if the slot extends substantially radially. If, in the case of other types of levelling shoe, the anchor bolt is disposed eccentrically, the operation of pushing the spacer ring onto the support ring is more easily accomplished if the slot is essentially parallel to the above-mentioned radial orientation but displaced laterally to align with the anchor bolt.

If the spacer ring is only intended to increase the height adjustment range of a levelling shoe, it is desirable for the upper and lower faces to be arranged to be parallel to each other and perpendicular to the axis. That means that the spacer ring is of uniform thickness along its entire periphery. If the spacer ring is to be used to compensate for an inclination or slope, it is also possible for it to be in the form of a wedge or taper member, for which reason then for example the lower face would be perpendicular to the axis and the top face would include an angle different from 90° with that axis.

Further advantages, features and details of the invention will be apparent from the following description of an embodiment of the invention.

BRIEF DESCRIPTION OF DRAWING

The FIGURE shows one embodiment of a spacer ring according to the invention which is arranged above a levelling shoe with a support ring disposed on its top side, and an inserted anchor bolt.

MODES FOR CARRYING OUT THE INVENTION

The lower part of the levelling shoe 40 with which the height can be adjusted is made up of a lower wedge or taper member 50 and an upper wedge or taper member 51 whose thicker sides are arranged at the left in the FIGURE, and a central wedge or taper member 52 whose thicker side is arranged at the right in the FIGURE. The central wedge or taper member 52 is moved in a horizontal direction with respect to the lower wedge or taper member 50 and the upper wedge or taper member 51 by rotating the adjusting screw 54, with the lower wedge or taper member 50 and the upper wedge or taper member 51 remaining stationary relative to each other in the horizontal direction. Due to the inclined configuration of the surfaces of the wedge or taper members 50 to 52, the upper wedge or taper member 51 is raised or lowered relative to the lower wedge or taper member 50 upon horizontal movement of the central wedge or taper member 52.

Arranged on the top side 42 of the levelling shoe 40, which as shown in the FIGURE has a square base surface, is a support ring 44 whose outside diameter corresponds to the edge length of the levelling shoe. The support ring 44 can, however, have an outside diameter that differs with the edge length of the levelling shoe 40. Likewise the base surface of the levelling shoe 40 may have a shape other than square such as, for example, a rectangular or trapezoidal shape.

An anchor bolt 46 is oriented substantially perpendicularly to the top side 42 of the upper wedge or taper member 51 and can be screwed from above into the lower wedge or taper member 50 of the levelling shoe 40 or can be anchored through the levelling shoe 40 by means of heavy-duty anchors in the ground of that surface on which the machine to be mounted is supported. In the embodiment shown in the Figure, the anchor bolt 46 is arranged eccentrically with respect to the support ring 44. In other embodiments of the levelling shoe it can be arranged centrally instead.

If the levelling shoe 40, besides height adjustability, is also to permit adjustability of inclination or slope, the surface (not shown) on which the support ring 44 bears on the top side 42 of the levelling shoe 40 is in the form of an annular portion of a sphere, in which case the corresponding contact surface of the support ring 44 is complementary thereto.

Above the support ring 44, the FIGURE illustrates a spacer ring 10 which is provided to rest on the support ring 44. The spacer ring 10 has a first or lower face 12 which comes to lie on the upper face 45 of the support ring 44. The lower face 12 has at a radially inward location an axially downwardly protruding annular projection 13 whose outside diameter is somewhat smaller than the inside diameter of the support ring 44, whereby the projection 13 engages into the support ring 44 and thus forms a positively locking connection in the plane of the contact surfaces, e.g., the face 45 of the support ring 44 and the lower face 12 of the spacer ring 10. At a radially inward location the upper face 14 has a groove or recess 15 which is substantially complementary in shape to the projection 13 at the lower face 12. By virtue of that arrangement, one spacer ring 10 can be fitted onto another spacer ring 10 which has already been set in place, in which case the projection 13 on the upper spacer ring 10 engages into the recess 15 in the lower spacer ring 10 and thereby forms a positively locking connection in the plane of the contact surfaces, which in this case comprise the lower face 12 of the upper spacer ring 10 and the upper face 14 of the lower spacer ring 10. Accordingly the use of a plurality of spacer rings 10 makes it possible to increase the height adjustment range of the levelling shoe 40 to a large extent without having to use spacer rings of different heights.

So that the anchor bolt 46 does not have to be disassembled in order to be able to fit the spacer ring 10 onto the support ring 44, a slot 20 is provided in the spacer ring 10. The slot 20 extends over the entire axial length, i.e., the height, of the spacer ring 10 and the projection 13. The slot 20 extends over the entire radial extent of the spacer ring 10 and the projection 13, e.g., from the inside peripheral surface 24 of the projection 13 to the outside peripheral surface 22 of the spacer ring 10. In the FIGURE the slot 20 is illustrated in such a way that it extends in a radial direction, but that does not necessarily have to be the case. Thus for example the slot 20 can also be arranged in a position which is in parallel displaced relationship with respect to the radius in the horizontal plane. That parallel displaced configuration of the slot 20 makes it easier to introduce the spacer ring 10 when the anchor bolt 46 is arranged at an eccentric position.

As illustrated in the FIGURE, the spacer ring 10 is of equal thickness over its entire periphery, in other words, its faces 12 and 14 are parallel to each other. In addition the faces 12 and 14 are also perpendicular to the axis 30 of the spacer ring 10, thereby ensuring flat surface contact on the support ring 44 and flat support over an area for the machine to be supported, by means of the upper face 14. The spacer ring 10 however may also be in the form of a wedge or taper member which, for example, is thinnest at the slot 20 while it is thickest at the location which is radially opposite to the slot. In that way the spacer ring 10 can also be used to compensate for substantial degrees of inclination of the contact surface relative to the machine to be supported.

The present invention is not limited to the embodiment described above. For example, the projection 13 may have a different shape from that illustrated in the FIGURE. As illustrated, spacer ring 10 has a projection 13 with surfaces that face radially outward and axially downward having a stair-step shaped cross section. In one alternative embodiment, spacer ring 10 has a projection with a surface that is inclined with respect to lower face 12, thereby having a ramp-shaped cross section. In yet another embodiment, spacer ring 10 has a projection with a curved surface. It will be appreciated that for each embodiment the recess 15 is complementary to the projection 13 in order to permit a plurality of spacer rings to be stacked in mutually superposed relationship. Furthermore a recess 15 can also be provided at the upper face 45 of the support ring 44 in a manner that differs with the structure shown in the Figure but is similar to the structure shown for the upper face 14 of the spacer ring 10. It will be appreciated that in that case the outside diameter of a projection 13 of a spacer ring 10 must then be smaller than the recess and not smaller than the inside diameter of the support ring 44.

What is claimed is:

1. A device for increasing the height adjustment range of a levelling shoe having an annular support surface with an inside diameter, including:

a spacer ring having a first face which has at a radially inward location an axially protruding annular projection and having a second face which has at a radially inward location a recess which is substantially complementary to the annular projection, wherein an outside diameter of the protruding annular projection is smaller than the inside diameter of the annular support surface so that the projection engages the annular support surface to form a connection that is positively locking in the plane of the first face when the first face of the spacer ring rests on the annular support surfaces, and wherein there is provided a slot that extends over the entire axial length of the spacer ring and the projection and extends from an outside peripheral surface of the spacer ring to an inside peripheral surface of the projection.

2. A device as set forth in claim 1, wherein the first and second faces are parallel to each other and perpendicular to an axis of the spacer ring.

3. A device as set forth in claim 1, wherein the slot extends substantially radially.

4. A device as set forth in claim 3, wherein the first and second faces are parallel to each other and perpendicular to an axis of the spacer ring.

5. A levelling shoe including a support ring and an anchor bolt, wherein the support ring may be raised or lowered by the levelling shoe and is arranged on a top side of the levelling shoe and has an inside diameter, wherein a spacer ring rests on the support ring and has a lower face with an axially protruding annular projection at a radially inward location, has an upper face with a recess that is substantially complementary to the annular projection at the radially inward location, and has a slot that extends over an entire axial length of the spacer ring and the projection and extends from an outside peripheral surface of the spacer ring to an inside peripheral surface of the projection, and wherein an outside diameter of the projection is smaller than the inside diameter of the support ring so that the projection engages the support ring to form a connection that is positively locking in a plane of contact surfaces and wherein the slot has a width that is greater than a diameter of the anchor bolt.

6. A levelling shoe as set forth in claim 5 comprising a plurality of spacer rings that lie upon one another, wherein the respective projection of an upper spacer ring engages a recess in a lower spacer ring to form a connection that is positively locking in a plane of contact surfaces.

7. A levelling shoe as set forth in claim 5 wherein the slot extends substantially radially.

8. A levelling shoe as set forth in claim 7 comprising a plurality of spacer rings that lie upon one another, wherein the respective projection of an upper spacer ring engages a recess in a lower spacer ring to form a connection that is positively locking in a plane of contact surfaces.

9. A levelling shoe as set forth in claim 7 wherein the upper and lower faces of the spacer ring are parallel to each other and perpendicular to an axis of the spacer ring.

10. A levelling shoe as set forth in claim 9 comprising a plurality of spacer rings that lie upon one another, wherein the respective projection of an upper spacer ring engages a recess in a lower spacer ring to form a connection that is positively locking in a plane of contact surfaces.

11. A levelling shoe as set forth in claim 5 wherein the upper and lower faces of the spacer ring are parallel to each other and perpendicular to an axis of the spacer ring.

12. A levelling shoe as set forth in claim 11 comprising a plurality of spacer rings that lie upon one another, wherein the respective projection of an upper spacer ring engages a recess in a lower spacer ring to form a connection that is positively locking in a plane of contact surfaces.

* * * * *